(12) United States Patent
Lee et al.

(10) Patent No.: US 9,152,723 B2
(45) Date of Patent: Oct. 6, 2015

(54) METHOD AND APPARATUS FOR PROVIDING INTERNET SERVICE IN MOBILE COMMUNICATION TERMINAL

(75) Inventors: Jeong-Soo Lee, Suwon-si (KR); SangGeun Lee, Seoul (KR); JongWoo Ha, Seoul (KR); Jung-Hyun Lee, Seoul (KR); Kyu-Sun Shim, Seoul (KR)

(73) Assignees: Samsung Electronics Co., Ltd., Suwon-Si (KR); Korea University Research and Business Foundation, Seoul (KR)

( * ) Notice: Subject to any disclaimer, the term of this patent is extended or adjusted under 35 U.S.C. 154(b) by 588 days.

(21) Appl. No.: 13/229,022

(22) Filed: Sep. 9, 2011

(65) Prior Publication Data

US 2012/0066234 A1 Mar. 15, 2012

(30) Foreign Application Priority Data

Sep. 10, 2010 (KR) ........................ 10-2010-0088709

(51) Int. Cl.
*G06F 17/30* (2006.01)
*G06F 17/00* (2006.01)
*G06Q 10/10* (2012.01)
*G06Q 30/02* (2012.01)

(52) U.S. Cl.
CPC ........ *G06F 17/30867* (2013.01); *G06Q 10/107* (2013.01); *G06Q 30/02* (2013.01)

(58) Field of Classification Search
CPC ... G06Q 30/02; G06Q 30/0247; G06Q 30/08; G06Q 30/0275; G06Q 30/0269; G06Q 30/0255; G06Q 30/0267; G06Q 30/0251; G06Q 30/0273; G06Q 30/0243; G06Q 30/0241; G06Q 30/0246; G06Q 40/04; G06Q 30/0201; G06Q 30/0256; G06Q 30/0261; G06Q 10/087
USPC .......... 707/999.2–5, 751, 745, 738, 725, 687, 707/821, 705, 709, 813; 705/14.4; 704/9
See application file for complete search history.

(56) References Cited

U.S. PATENT DOCUMENTS

| 6,704,729 | B1 * | 3/2004 | Klein et al. ............................ 1/1 |
| 6,810,376 | B1 * | 10/2004 | Guan et al. ......................... 704/9 |
| 7,860,871 | B2 * | 12/2010 | Ramer et al. .................. 707/751 |
| 2008/0301126 | A1 | 12/2008 | Asai |

FOREIGN PATENT DOCUMENTS

| KR | 10-2009-0131749 | 12/2009 |
| KR | 10-2010-0041582 | 4/2010 |
| KR | 10-2010-0050992 | 5/2010 |

* cited by examiner

*Primary Examiner* — Yicun Wu

(57) ABSTRACT

A method and apparatus provide an Internet service in a mobile communication terminal. The method includes determining a user interest subject from user data existing within the mobile communication terminal, collecting service items through network access, determining a subject for each of the collected service items, determining relevance between the user interest subject and each of the service items, and recommending a service item according to the relevance.

20 Claims, 14 Drawing Sheets

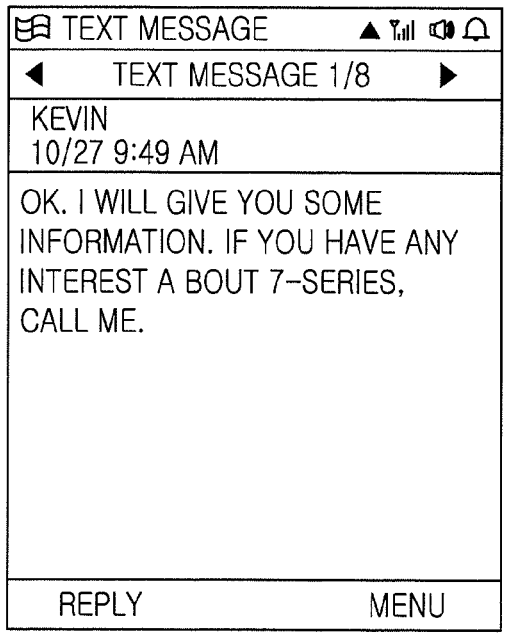
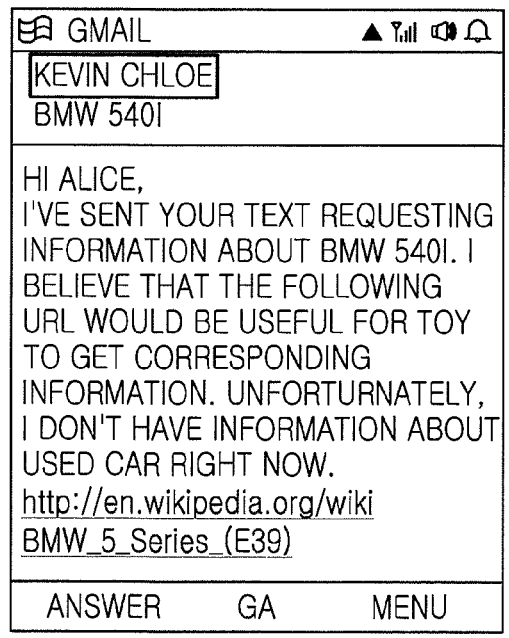
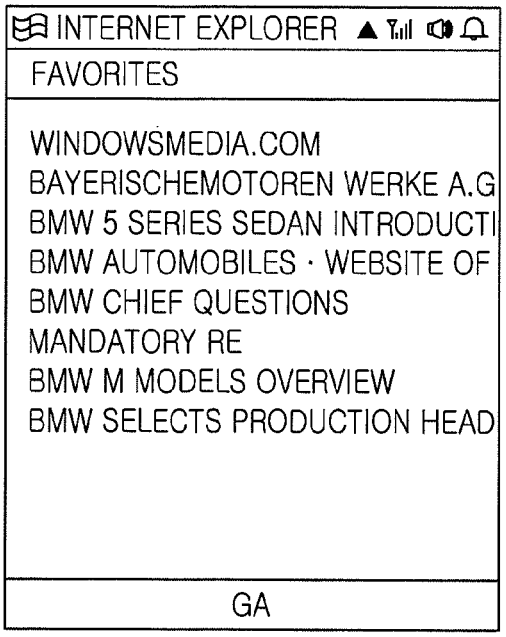
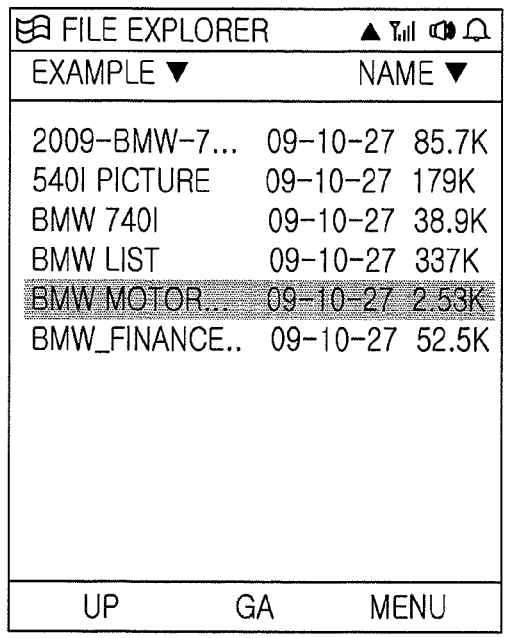
FIG.6

```xml
<?XML VERSION = "1,0" ENCODING = "UTF-16"?>
<EXTRACTDATA>
   <RECIEVESMSLIST>
      <SMS DATA = "20091027  09:49:36" TEXT = "OK. I WILL GIVE SOME INFOR
      <SMS DATA = "20091027  09:49:06" TEXT = "WELCOM. IF YOU HAVE ANY
      <SMS DATA = "20091026  03:48:21" TEXT = "OK. I WILL GIVE YOU THEY H
      <SMS DATA = "20091026  03:48:06" TEXT = "YES, CAR VENDOR SAID THA
      <SMS DATA = "20091026  03:48:44" TEXT = "YES, PICTURE AND OTHER IN
      <SMS DATA = "20091026  03:37:30" TEXT = "I THINK SO, YOU CAN CHOO
      <SMS DATA = "20091026  03:37:16" TEXT = "YES, I LIKE 7-SERIES. AND T
      <SMS DATA = "20091026  03:37:03" TEXT = "AH~ MY FRIEND, LEE HAS B
   </RECIEVESMSLIST>
   <SENDSMSLIST>
      <SMS DATA = "20091027  09:49:48" TEXT = "YES, OK. BYE~" NAME = "KE
      <SMS DATA = "20091027  09:49:23" TEXT = "OH~ SORRY, PLEASE GIVE A
      <SMS DATA = "20091026  03:46:38" TEXT = "THANK YOU. I WILL WAIT YO
      <SMS DATA = "20091026  03:46:23" TEXT = "OH~ I AM INTERESTED THAT
      <SMS DATA = "20091026  03:46:10" TEXT = "SURE, ESPECIALLY 540I AND
      <SMS DATA = "20091026  03:45:56" TEXT = "OK. DO YOU HAVE ANY INFO
      <SMS DATA = "20091026  03:45:42" TEXT = "OH~ BUT MINI IS VERY SMAL
      <SMS DATA = "20091026  03:45:28" TEXT = "REALLY? HOWVER, THEIR AR
      <SMS DATA = "20091026  03:45:11" TEXT = "I HAVE A PLAN TO BUY A NE
   </SENDSMSLIST>
   <FILEINFOLIST>
      <FILEINFO DATA = "20091027  11:17:24" TEXT = "2009-BMW-7-SERIES-
      <FILEINFO DATA = "20091027  11:12:04" TEXT = "BMW 740I.JPG" APP = "
      <FILEINFO DATA = "20091027  11:24:50" TEXT = "BMW MOTORRAD DAYS
      <FILEINFO DATA = "20091027  11:25:36" TEXT = "BMW LIST" APP = "DOCU
      <FILEINFO DATA = "20091027. 11:23:08" TEXT = "BMW FINANCE_FIANL_ "
      <FILEINFO DATA = "20091027  11:12:34" TEXT = "540I PICTURE.JPG" APP
   </FILEINFOLIST>
   <EMAILLIST>
      <EMAILINFO DATA = "20091025  20:01:54" SUBJECT = "2011 BMW 5 SERI
      <EMAILINFO DATA = "20091025  20:01:41" SUBJECT = "NEW SET OF 2011
      <EMAILINFO DATA = "20091025  20:01:28" SUBJECT = "BMW BELIEVES IN
      <EMAILINFO DATA = "20091025  20:01:13" SUBJECT = "VIDEO WITH THE R
      <EMAILINFO DATA = "20091025  20:00:56" SUBJECT = "VIDEO: MINI DRIVE
      <EMAILINFO DATA = "20091025  20:00:28" SUBJECT = "NEW INTERIOR AN
   </EMAILLIST>
   <WEBUSAGEINFOLIST>
      <WEBUSAGEINFOLIST DATA = "20091027  08:00:00" TEXT = "BMW 5 SER
      <WEBUSAGEINFOLIST DATA = "20091027  08:00:00" TEXT = "BMW M MOD
```

FIG.7

SERVICE ITEM EXAMPLE – NEWS

BMW TO LEASE HYDROGEN CARS IN APRIL
SEDAN WILL HAVE TWO TANKS, ONE FOR GASOLINE AS WELL; GM SHOWS OFF SEQUEL

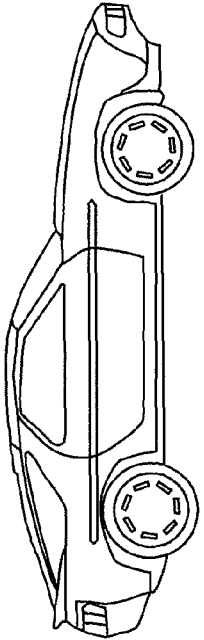

EAGER TO PUT ITS STAMP ON CARS WITH GREEN CREDENTIALS, BMW ANNOUNCED TUESDAY THAT IT WILL ROLL OUT THE WORLD'S FIRST HYDROGEN-BURNING CAR IN SERIAL PRODUCTION EARLY NEXT YEAR.

DUBBED THE HYDROGEN 7, THE SPECIALLY EQUIPPED 7-SERIES EXECUTIVE CARS EMIT ONLY WATER VAPOR WHEN RUNNING ON HYDROGEN. THAT MEANS ZERO EMISSIONS OF POLLUTANTS AND CARBON DIOXIDE, A GAS THAT MANY SCIENTISTS TIE TO GLOBAL WARMING.

SERVICE ITEM EXAMPLE – MOBILE APP

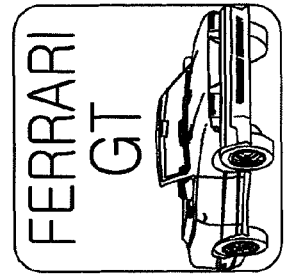

FERRARI GT

- SELLER : GAMELOFT
- CATEGORY : GAMES > ARCADE
- TYPE : APPLICATION
- VERSION : 1.03 (04-JUN-2010)
- RELEASED : 29-AUG-2009
- SIZE : 44.22MB
- AGE : ALL AGE
- LANGUAGE : -
- OS : WINDOWS MOBILE
- RATING : ★★★★☆
- PRICE : $3.50

© DESCRIPTION

OIN THE ELITE CIRCLE OF FERRARI CAR OWNERS AND TAKE PART IN EXCLUSIVE RACES AROUND THE GLOBE IN THE TRUEST AND MOST IMMERSIVE RACING GAME ON IPHONE. MAKE YOUR DREAM COME TRUE... DRIVE YOUR OWN FERRARI CAR.

IN THE NEXT UPDATE: AN ONLINE MULTIPLAYER MODE TO FACE DRIVERS FROM ALL OVER THE WORLD.

RECOMMENDED FOR FANS OF CAR GAMES SUCH AS: ASPHALT 4, NEED FOR SPEED UNDERCOVER, CRASH NITRO KART, MOTO CHASER, RAGING THUNDER, AND CRO-MAG RALLY.

METHOD AND APPARATUS FOR PROVIDING INTERNET SERVICE IN MOBILE COMMUNICATION TERMINAL

CROSS-REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on Sep. 10, 2010 and assigned Serial No. 10-2010-0088709, the contents of which are herein incorporated by reference.

TECHNICAL FIELD OF THE INVENTION

The present invention relates to a method and apparatus for providing an Internet service in a mobile communication terminal. More particularly, the present invention relates to a method and apparatus for analyzing user data of a mobile communication terminal and recommending a service in the mobile communication terminal.

BACKGROUND OF THE INVENTION

With the rapid development of mobile communication technologies, various services using mobile communication terminals are being provided. Particularly, in recent years, a service of providing information on a user interest field considering the user interest field in a mobile communication terminal, i.e., a personalized information service of an on-demand scheme is being provided.

FIG. 1 illustrates a method of providing a personalized information service of an on-demand scheme according to the conventional art.

As illustrated in FIG. 1, the conventional personalized information service is of a scheme in which, if a mobile communication terminal 100 registers a user interest field to a user information storage server 102 (operation 110), the user information storage server 102 provides the registered user interest field to a personalized information provision server 104, and the personalized information provision server 104 searches service information associated with the user interest field and then provides the searched service information to the mobile communication terminal 100 (operation 112).

In the conventional personalized information service, a mobile communication terminal should previously register a user interest field to a server as above. That is, the conventional personalized information service has a disadvantage that, unless the mobile communication terminal previously registers the user interest field to the server, the mobile communication terminal cannot be provided with desired information. Further, in the conventional personalized information service, whenever a user's own interest field changes, a user has to register the changed interest field to the server himself/herself, so there is a problem of causing troublesomeness and inconvenience at user side.

SUMMARY OF THE INVENTION

To address the above-discussed deficiencies of the prior art, it is a primary object to provide at least the advantages below. Accordingly, one aspect of the present disclosure is to provide a method and apparatus for analyzing user data and recommending an Internet service in a mobile communication terminal.

Another aspect of the present disclosure is to provide a method and apparatus for determining a user interest subject from user data, collecting Internet service items, determining a subject of the service items, and then recommending a service item corresponding to the user interest subject in a mobile communication terminal.

A further aspect of the present disclosure is to provide a method and apparatus for extracting term vectors from user data and each service item and determining syntactic similarity between respective term vectors in a mobile communication terminal.

Yet another aspect of the present disclosure is to provide a method and apparatus for extracting subjects from user data and each service item and determining semantic similarity between respective subjects in a mobile communication terminal.

Still another aspect of the present disclosure is to provide a method and apparatus for determining similarity between a user interest subject and a service item subject, and recommending a service according to the similarity in a mobile communication terminal.

Still another aspect of the present disclosure is to provide a method and apparatus for determining a term vector reflecting a feature of a hierarchical structure between categories, for each category of a subject classification tree in a mobile communication terminal.

Still another aspect of the present disclosure is to provide a method and apparatus for determining relevance to other categories for each category of a subject classification tree and, based on the relevance, recommending a service corresponding to a user interest subject in a mobile communication terminal.

The above aspects are achieved by providing a method and apparatus for providing an Internet service in a mobile communication terminal.

According to one aspect of the present disclosure, a method for providing an Internet service in a mobile communication terminal is provided. The method includes determining a user interest subject from user data existing within the mobile communication terminal, collecting service items through network access, determining a subject for each of the collected service items, determining relevance between the user interest subject and each of the service items, and recommending a service item according to the relevance.

According to another aspect of the present disclosure, an apparatus for providing an Internet service in a mobile communication terminal is provided. The apparatus includes a user interest subject determination unit, a service item collection and classification unit, a service item ranking unit, and a service recommendation unit. The user interest subject determination unit determines a user interest subject from user data existing within the mobile communication terminal. The service item collection and classification unit collects service items through network access, and determines a subject for each of the collected service items. The service item ranking unit determines relevance between the user interest subject and each of the service items. The service recommendation unit recommends a service item according to the relevance.

Other aspects, advantages and salient features of the disclosure will become apparent to those skilled in the art from the following detailed description, which, taken in conjunction with the annexed drawings, discloses illustrative embodiments of the disclosure.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 is a diagram illustrating user data in a mobile communication terminal according to an embodiment of the present disclosure;

FIG. 7 is a diagram illustrating an eXtensible Markup Language (XML) file generated in a mobile communication terminal according to an embodiment of the present disclosure;

FIG. 9 is a diagram illustrating an example of an Internet service item collected in a mobile communication terminal according to an embodiment of the present disclosure;

Throughout the drawings, like reference numerals will be understood to refer to like parts, components and structures.

DETAILED DESCRIPTION OF THE INVENTION

FIGS. 2 to 13B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Preferred embodiments of the present invention will be described herein below with reference to the accompanying drawings. In the following description, well-known functions or constructions are not described in detail since they would obscure the invention in unnecessary detail. And, terms described below, which are defined considering functions in the present invention, can be different depending on user and operator's intention or practice. Therefore, the terms should be defined on the basis of the disclosure throughout this specification Below, illustrative embodiments of the present disclosure provide a method and apparatus for analyzing user data and recommending a service in a mobile communication terminal.

Figure 1:
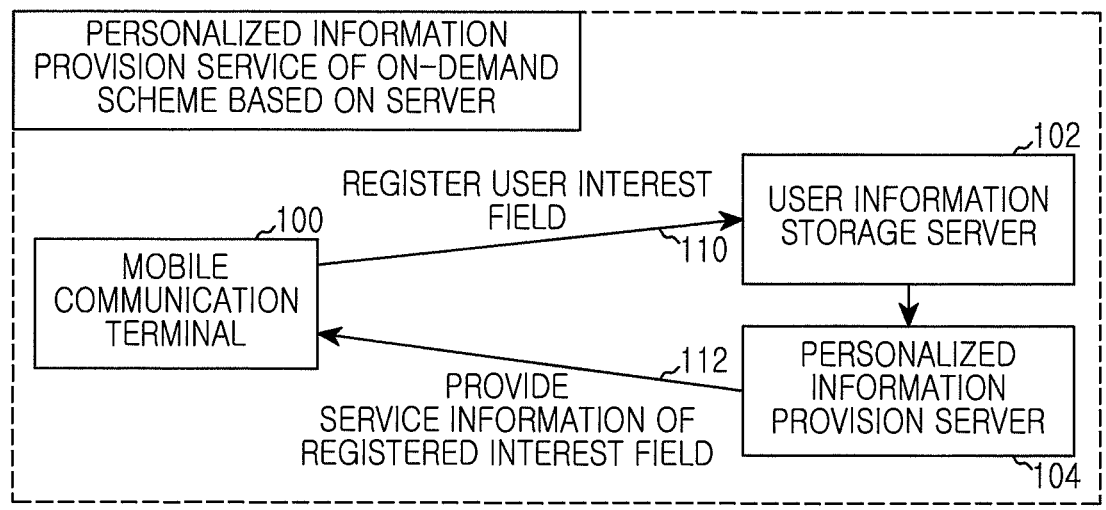
FIG. 1 is a diagram illustrating a method of providing a personalized information service of an on-demand scheme according to the conventional art.
Figure 2:
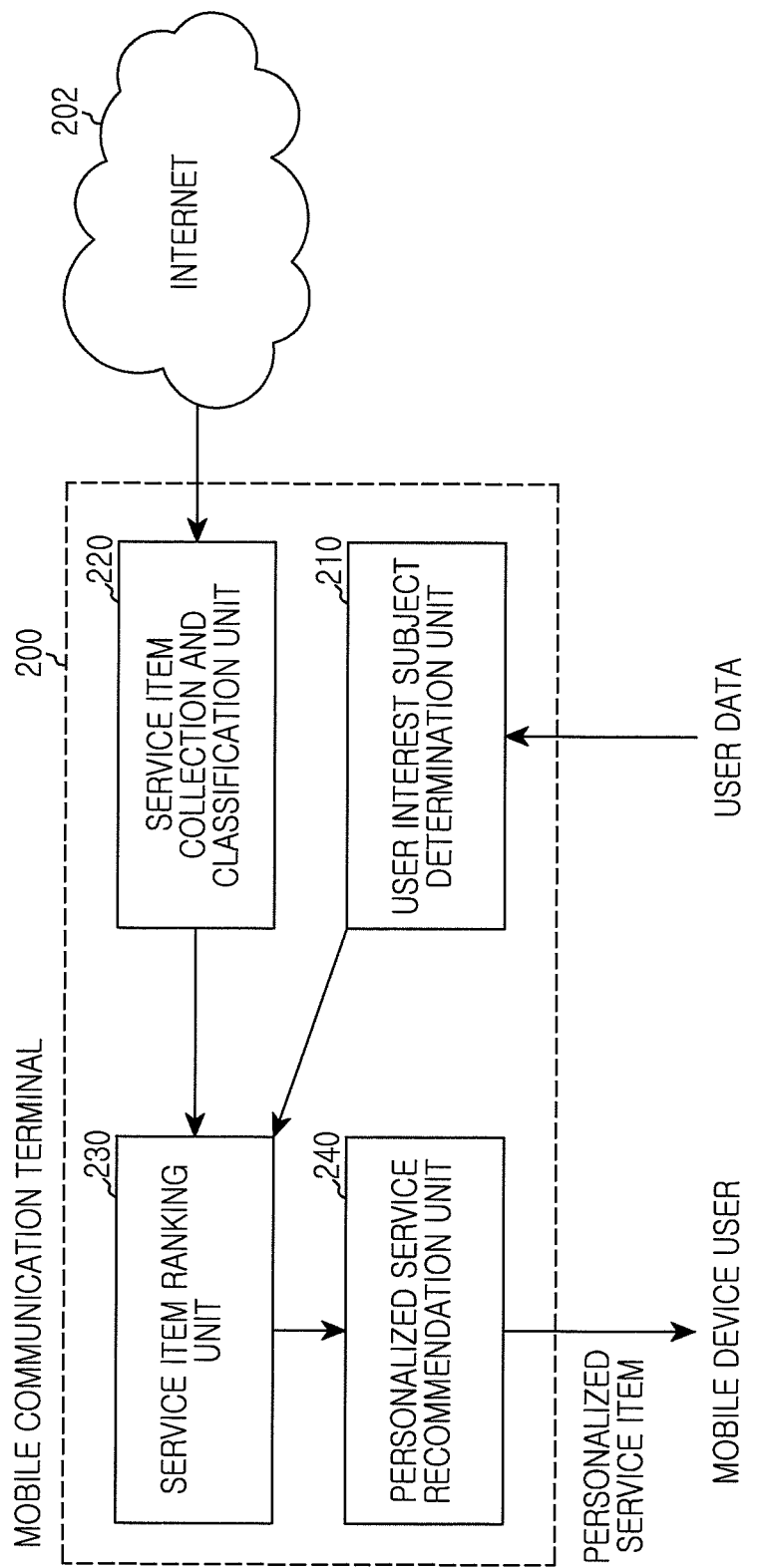
FIG. 2 is a block diagram illustrating a construction of a mobile communication terminal for providing a personalized information service according to the present disclosure.

FIG. 2 illustrates a construction of a mobile communication terminal for providing a personalized information service according to the present disclosure.

Referring to FIG. 2, the mobile communication terminal 200 includes a user interest subject determination unit 210, a service item collection and classification unit 220, a service item ranking unit 230, and a personalized service recommendation unit 240.

The user interest subject determination unit 210 analyzes user data existing within the mobile communication terminal and determines a user interest subject. Here, the user data means data such as a short message existing within the mobile communication terminal, a multimedia message, an electronic-mail (e-mail), a file, a schedule, a memo, Web-usage information and the like. In detail, the user interest subject determination unit 210 extracts a text from the user data existing within the mobile communication terminal, analyzes the text, generates term vectors, classifies the term vectors according to a subject classification tree embedded in the mobile communication terminal, and determines a user interest subject. Here, the subject classification tree is classifying, by subject, concepts suitable for indicating user interest fields and expressing the classified concepts in a tree structure. For example, the subject classification tree can be an open directory project widely known in the art. Undoubtedly, a general open directory project is of as much wide range as being a Web directory, so the present disclosure may extract certain categories suitable for indicating user interest fields from the open directory project, for use. The user interest subject determination unit 210 is described later in detail with reference to FIG. 3.

The service item collection and classification unit 220 accesses the Internet 202, collects Internet service items, analyzes texts of the collected service items, generates term vectors, classifies the term vectors according to a subject classification tree embedded in the mobile communication terminal, and determines a subject of each of the collected service items. The service item collection and classification unit 220 is described later in detail with reference to FIG. 4.

The service item ranking unit 230 determines syntactic similarity and semantic similarity using the term vector and user interest subject for the user data and the term vector and service item subject for the service items, determines the total similarity between the user interest subject and the service item subject using the syntactic similarity and semantic similarity, and determines a relevance rank of each of the service items to the user interest subject. The service item ranking unit 230 is described later in detail with reference to FIG. 5.

Figure 12:
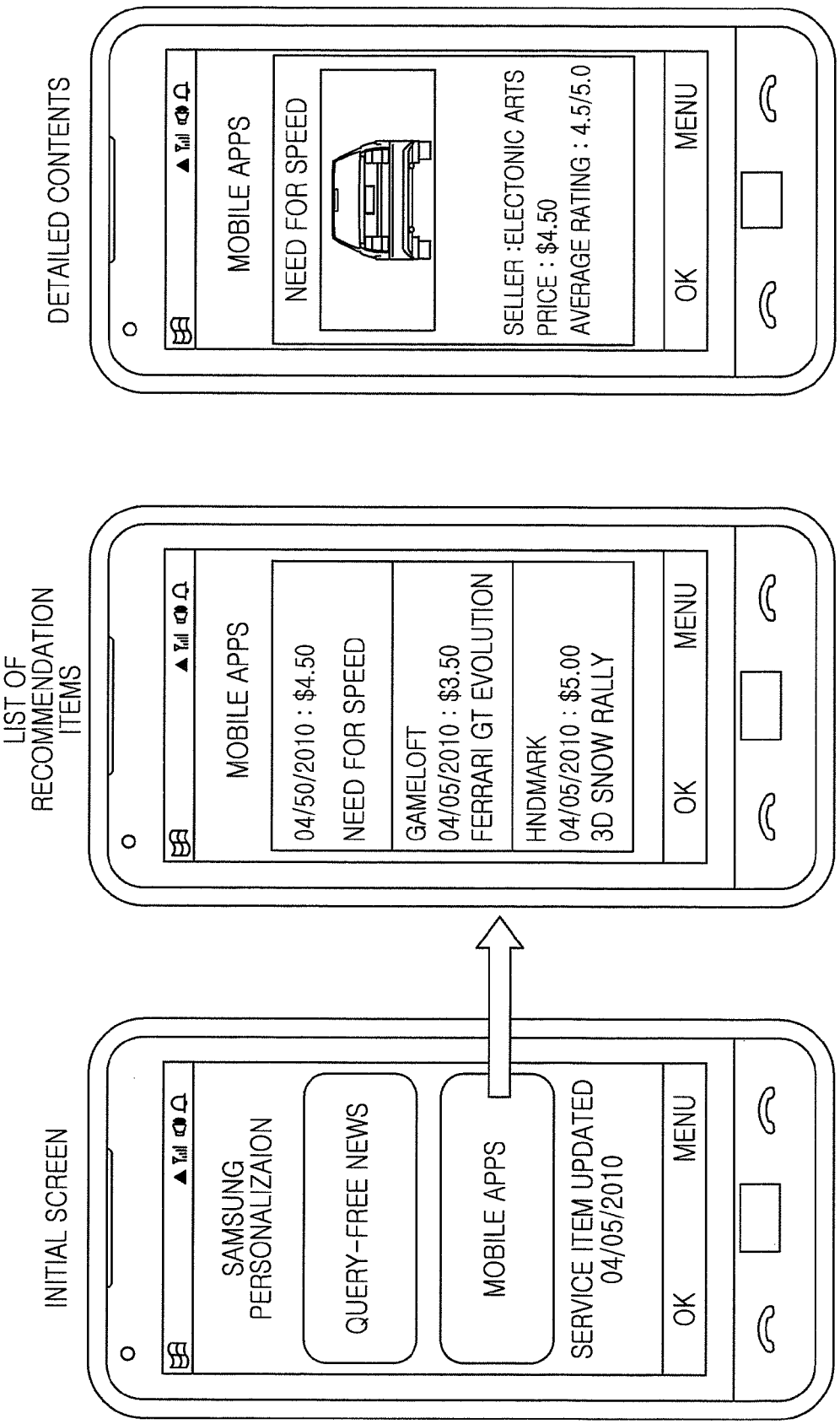
FIG. 12 is a diagram illustrating a screen construction of recommending a service item in a mobile communication terminal according to an embodiment of the present disclosure.

The personalized service recommendation unit 240 controls a function for, if a service item recommendation event occurs, displaying a window for selecting the kind of recommendation service item through a screen and, if the kind of recommendation service item is selected, determining service items corresponding to the selected kind in consideration of a relevance rank determined in the service item ranking unit 230 and displaying a list including the determined service items on the screen. Further, the personalized service recommendation unit 240 controls and processes a function for, if any one of the recommendation service items is selected, displaying the detailed contents of the selected service item on the screen. For example, as illustrated in FIG. 12, the personalized service recommendation unit 240 controls and processes a function for displaying a window for selecting which kind of service item will be recommended among news or mobile Applications (Apps), displaying a list including mobile App services of a great relevance to a user interest subject and, if the mobile App service is selected by a user, displaying detailed information on the mobile App service selected by the user on the screen.

Thus, a detailed construction of the mobile communication terminal is described below with reference to FIGS. 3 to 5.

Figure 3:
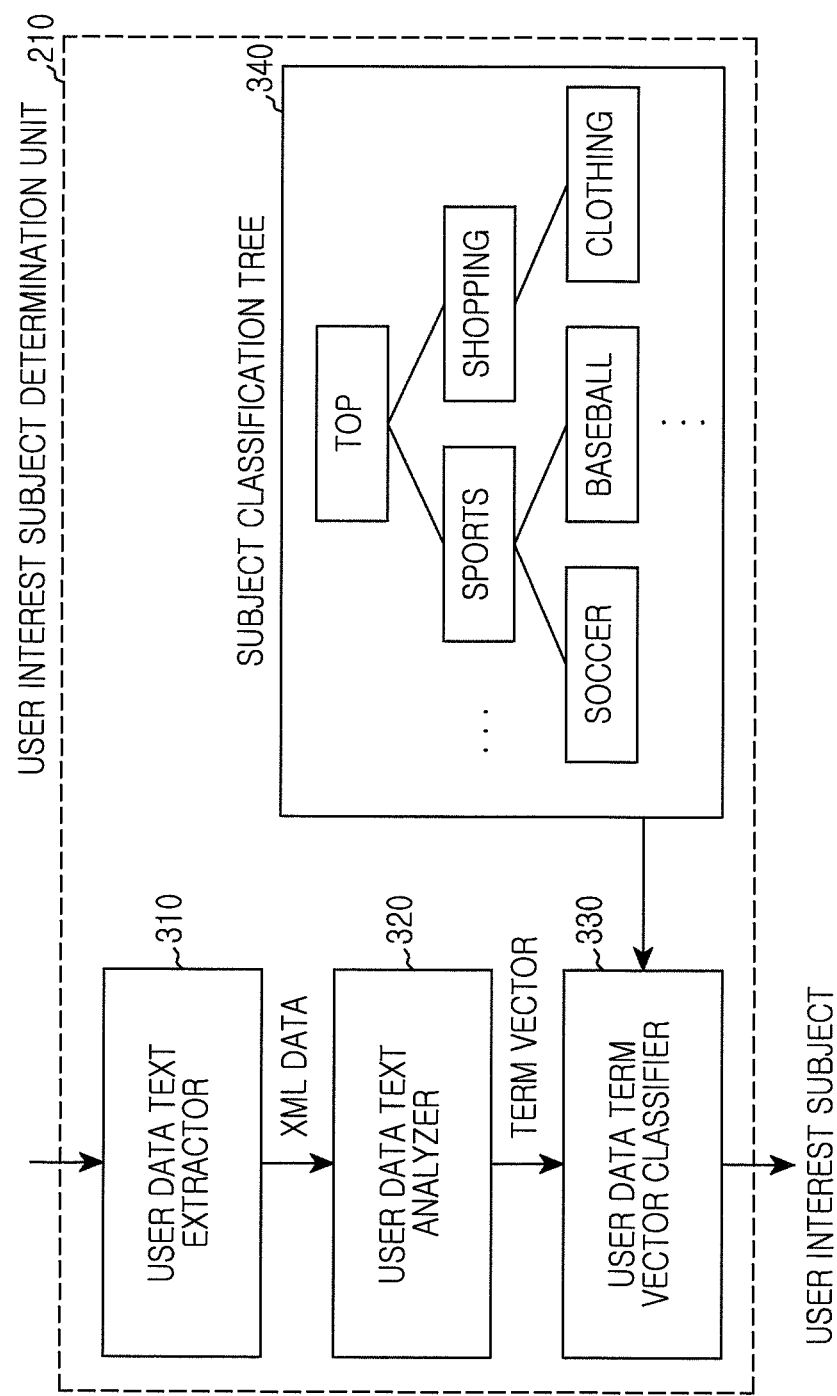
FIG. 3 is a block diagram illustrating a detailed construction of a user interest subject determination unit in a mobile communication terminal according to an embodiment of the present disclosure.

FIG. 3 illustrates a detailed construction of a user interest subject determination unit in a mobile communication terminal according to an embodiment of the present disclosure.

Referring to FIG. 3, the user interest subject determination unit 210 includes a user data text extractor 310, a user data text analyzer 320, and a user data term vector classifier 330.

The user data text extractor 310 extracts a text representing a user interest subject from user data existing within the mobile communication terminal. For instance, the user data text extractor 310 can extract a text from a short message, a multimedia message, an e-mail, a file, a schedule, a memo, Web-usage information and the like stored within the mobile communication terminal as illustrated in FIG. 6. At this time, the user data text extractor 310 extracts a generation time and generation position of the extracted text, and metadata of a corresponding application together, and stores the extraction result in an Extensible Markup Language (XML) form. Here, the metadata of the application includes at least one of the kind of the application, a feature, a revision time, a generation time, and context information. Here, the context information can be used for applying a weight at the time of generating a term vector in the user data text analyzer 320. That is, the user data text extractor 310 can extract a text from the user data of FIG. 6 and, at this time, generate an XML file of FIG. 7.

The user data text analyzer 320 analyzes text data extracted from the user data text extractor 310 and generates a term vector according to a vector space model. Here, the term vector is composed of individual terms existing in the text data, and can be generated reflecting weights dependent on the importance of respective terms within an extracted text. At this time, the weights dependent on the importance of the respective terms can be determined considering the frequency within the extracted text, and a generation time and generation position of the text. For instance, in an example where the frequency of appearance of a specific term in texts provided from the user data text extractor 310 is high, the user data text analyzer 320 can determine the specific term as a key term expressing a user interest subject and set a high weight to the specific term. Further, the user data text analyzer 320 can set weights to respective terms using a Term Frequency Inverse Document Frequency (TFIDF) weight allocation method widely known in the art, or can set weights using context information recorded in an XML file generated in the user data text extractor 310. For instance, the user data text analyzer 320 can set higher weights to more recently generated terms based on the context information recorded in the XML file and, through this, can obtain an effect of being capable of reflecting a recent user interest subject.

If term vectors for respective terms within a text are generated in the user data text analyzer 320, the user data term vector classifier 330 classifies the generated term vectors based on a subject classification tree 340 embedded in the mobile communication terminal and determines a user interest subject. Here, the subject classification tree 340 classifies, by subject, concepts suitable for indicating user interest fields and expresses the classified concepts in a tree structure. For example, the subject classification tree 340 can be an open directory project known in the art. Undoubtedly, a general open directory project known in the art is of as much wide range as being a Web directory, so the present disclosure may extract certain some categories suitable for indicating user interest fields from the open directory project, for use. Here, each category of the subject classification tree 340 can include a list of Web pages corresponding to the each category. The list of Web pages may include terms representing a characteristic of a corresponding category.

Figure 8:
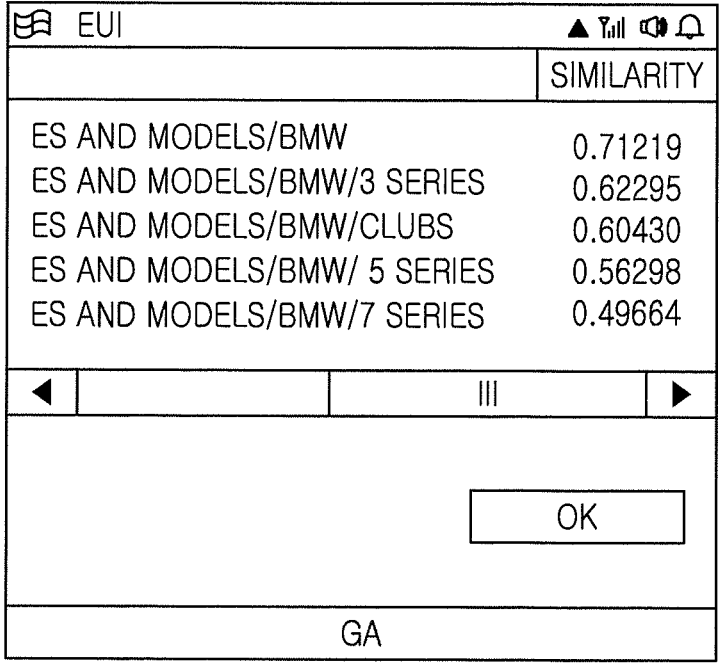
FIG. 8 is a diagram illustrating a user interest subject determined based on user data in a mobile communication terminal according to an embodiment of the present disclosure.

The user data term vector classifier 330 can perform machine learning for term vector classification with reference to the list of Web pages included in each category of the subject classification tree 340. At this time, a machine learning algorithm can be Rocchio's algorithm, K-Nearest-Neighbor (KNN) algorithm, Naive Bayes (NB) algorithm, Support Vector Machine (SVM) algorithm, and the like widely known in the art. For instance, in a example where Web pages 'a', 'b', and 'c' are included in a category 'A', the user data term vector classifier 330 may be learned to classify, as the category 'A', term vectors corresponding to the Web page 'a'. After the learning is completed, if a user data term vector is input, the user data term vector classifier 330 can determine a category corresponding to the user data term vector with reference to the subject classification tree 340, and determine a subject of the determined category as a user interest subject corresponding to the user data term vector. For instance, the user data term vector classifier 330 may classify term vectors extracted from the user data of FIG. 6 and, as illustrated in FIG. 8, classify the term vectors into five categories and determine a subject of each category as a user interest subject.

Figure 4:
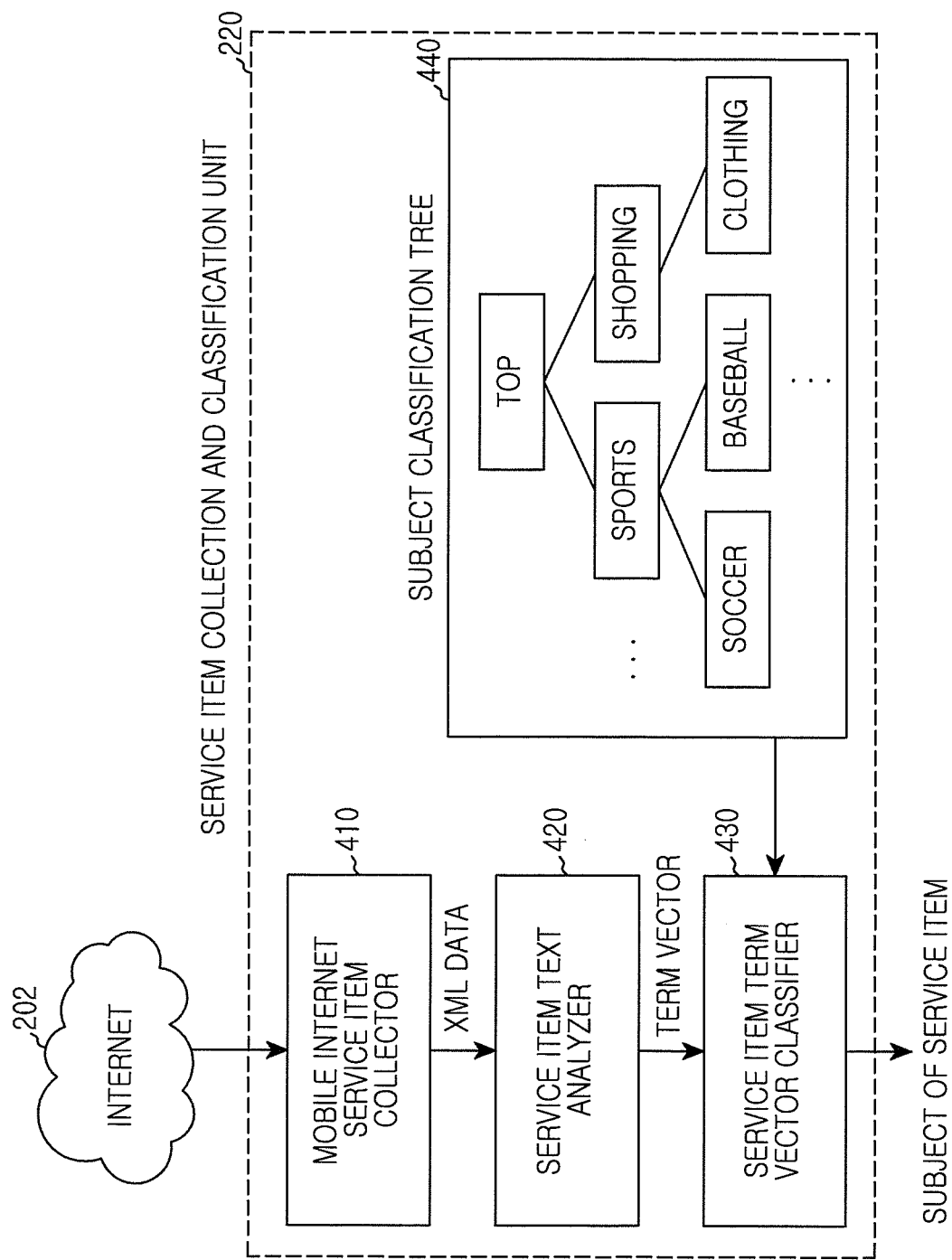
FIG. 4 is a block diagram illustrating a detailed construction of a service item collection and classification unit in a mobile communication terminal according to an embodiment of the present disclosure.

FIG. 4 illustrates a detailed construction of a service item collection and classification unit in a mobile communication terminal according to an embodiment of the present disclosure.

Referring to FIG. 4, the service item collection and classification unit 220 includes a mobile Internet service item collector 410, a service item text analyzer 420, and a service item term vector classifier 430.

The mobile Internet service item collector 410 accesses the mobile Internet 202 and collects service items (e.g., news and mobile Apps) recommendable to a user. For instance, the mobile Internet service item collector 410 collects the latest mobile App information from a mobile App site suitable to an operation environment of the mobile communication terminal, and collects the latest news from a news portal site enabling information collection. At this time, the mobile Internet service item collector 410 can collect related service items using a user interest subject determined in the user interest subject determination unit 210.

The service item text analyzer 420 extracts a text from service items collected in the mobile Internet service item collector 410, analyzes the extracted text, and generates a term vector according to a vector space model. Here, the term vector is composed of individual terms existing in the text of the collected service items, and reflects weights dependent on the importance of respective terms within the extracted text. Here, the weights dependent on the importance of respective terms can be determined considering the frequency of each term within the extracted text and a generation time and generation position of the text. That is, the service item text analyzer 420 may set the weights dependent on the importance of the respective ten us in the same method as that of the user data text analyzer 320.

The service item term vector classifier 430 classifies term vectors generated in the service item text analyzer 420 based on a subject classification tree 440 embedded in the mobile communication terminal, and determines a subject of each of the collected service items. Here, the service item term vector classifier 430 classifies the term vectors in the same method as that of the user data term vector classifier 330 and determines a corresponding subject. Further, the subject classification tree 440 referred in the service item term vector classifier 430 is the same as the subject classification tree 340 referred in the user data term vector classifier 330.

Figure 5:
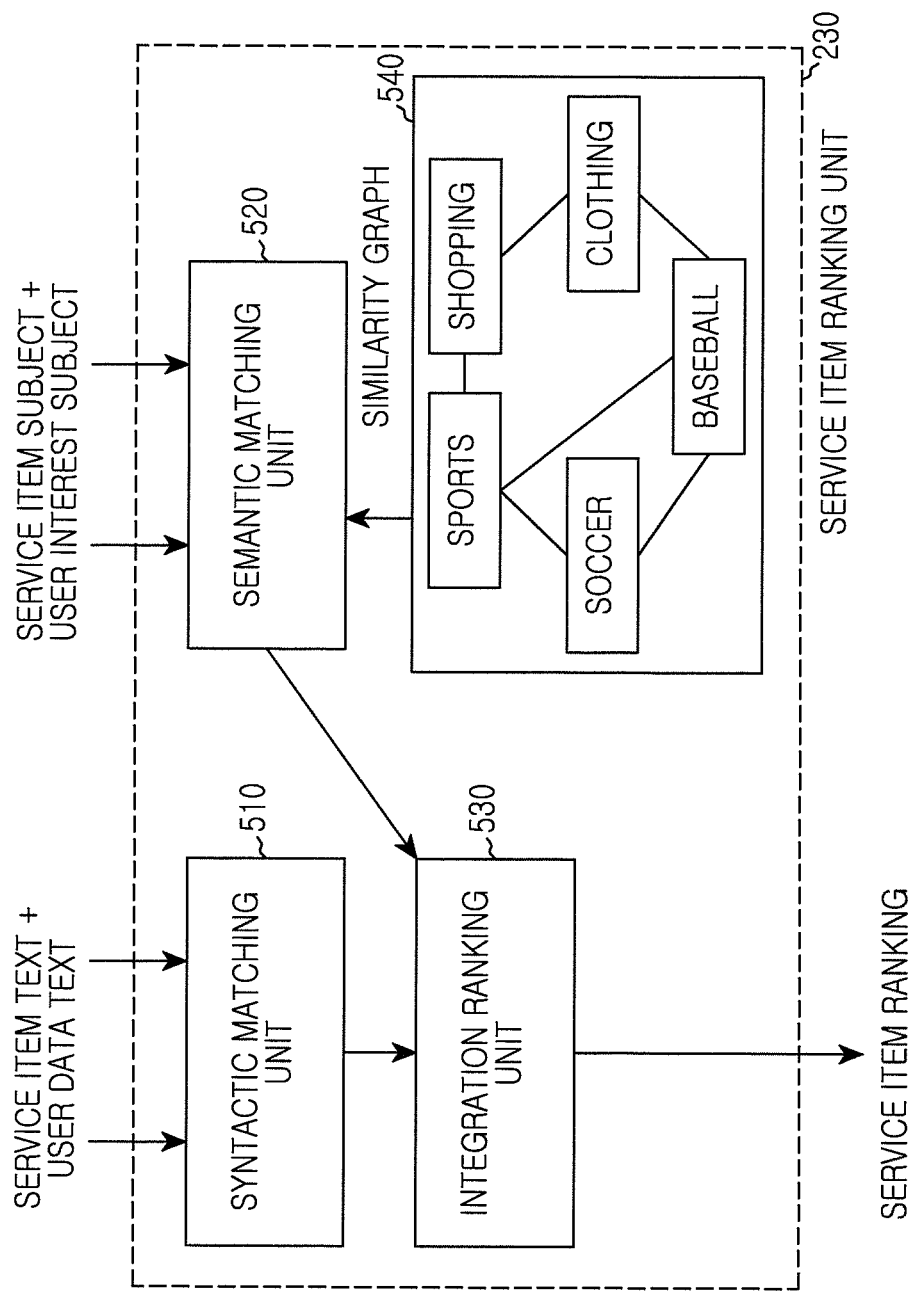
FIG. 5 is a block diagram illustrating a detailed construction of a service item ranking unit in a mobile communication terminal according to an embodiment of the present disclosure.

FIG. 5 illustrates a detailed construction of a service item ranking unit in a mobile communication terminal according to an embodiment of the present disclosure.

Referring to FIG. 5, the service item ranking unit 230 includes a syntactic matching unit 510, a semantic matching unit 520, and an integration ranking unit 530.

The syntactic matching unit 510 determines syntactic similarity between a term vector generated in the user data text analyzer 320 and a term vector generated in the service item text analyzer 420. By determining the cosine similarity of a vector space model according to Equation 1 below, the syntactic matching unit 510 determines syntactic similarity between a term vector for user data and a term vector for service items.

Equation 1 below represents a formula of determining cosine similarity.

$$SyntactisS\,core(\vec{u}, \vec{s}_i) = \cos(\vec{u}, \vec{s}_i) = \frac{\vec{u} \cdot \vec{s}_i}{\|\vec{u}\|\|\vec{s}_i\|} \quad (1)$$

Here, the '$\vec{u}$' represents a term vector for user data, and the '$\vec{s}_i$' represents a term vector for service items.

The semantic matching unit 520 determines semantic similarity between a user interest subject extracted from the user data term vector classifier 330 and a service item subject determined in the service item term vector classifier 430. By applying a weighted Personalized PageRank (wPPR) algorithm to a similarity graph 540 representing semantic similarity between respective categories in a subject classification tree, the semantic matching unit 520 determines the semantic similarity between the user interest subject and the service item subject. Here, the similarity graph 540 is a conversion of a hierarchical tree structure of respective categories into a graph structure connected according to semantic similarity between categories in the subject classification tree. Each node of the similarity graph 540 represents each category of the subject classification tree, and a link between respective nodes represents the existence of semantic similarity between corresponding categories. Further, the wPPR algorithm, which is the application of a weight to a Personalized PageRank algorithm widely known in the art, is described below in detail.

A method for generating links between respective nodes of the similarity graph 540 is of three operations as follows. The similarity graph 540 may be generated in the semantic matching unit 520, or may be generated in a different function block of the mobile communication terminal.

Operation 1 is the operation of determining a centroid vector for each category of the subject classification tree according to Equation 2 below. The centroid vector, a vector being representative of learning data of each category, is an average term vector of the learning data. Here, the learning data can be Web pages of an open directory project used at the time of machine learning of the user data term vector classifier 330 or service item term vector classifier 430.

Equation 2 below represents a formula of determining a centroid vector of each category.

$$\vec{\mu}(c) = \frac{1}{|D_c|} \sum_{d \in D_c} \vec{v}(d) \quad (2)$$

Here, the 'c' means a category, the '$\vec{\mu}(c)$' means a centroid vector of the category 'c', the '$D_c$' means a learning data set of the category 'c', and the '$\vec{v}(d)$' means a term vector for learning data 'd.'

Operation 2 is the operation of determining a merge centroid vector for each category of the subject classification tree according to Equation 3 below. The merge centroid vector represents the reflection of a feature of a hierarchical structure of the subject classification tree in the centroid vectors of the respective categories. That is, the centroid vector includes only a feature of a corresponding category and does not reflect hierarchical relationship between categories within the subject classification tree, but the merge centroid vector represents the inclusion of features of centroid vectors of descendent categories in a centroid vector of a parent category such that the parent category can include features of child categories.

Equation 3 below represents a formula of determining a merge centroid vector.

$$\vec{\mu}'(c) = \frac{1}{1+|child(c)|} \left( \frac{\vec{\mu}(c)}{\|\vec{\mu}(c)\|} + \sum_{c_k \in child(c)} \frac{\vec{\mu}'(c_k)}{\|\vec{\mu}'(c_k)\|} \right) \quad (3)$$

Here, the '$\vec{\mu}'(c)$' means a merge centroid vector for a category 'c', the 'child(c)' means the set of child categories of the category 'c', $c_k$ means a $k^{th}$ category, and the '$\vec{\mu}(c)$' means a centroid vector for the category 'c'.

Figure 10:
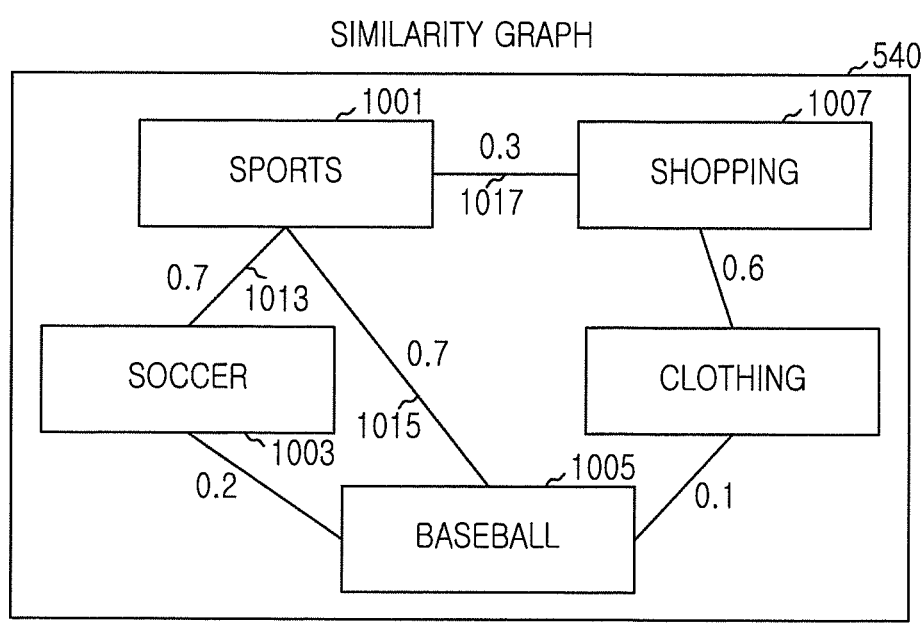
FIG. 10 is a diagram illustrating similarity between service item subjects in a mobile communication terminal according to an embodiment of the present disclosure.

Operation 3 is the operation of determining semantic similarity between all categories. The semantic similarity between the categories means cosine similarity between merge centroid vectors for the categories. Here, the semantic matching unit 520 compares the semantic similarity between the categories with a threshold value. In an example where the semantic similarity between the categories is greater than the threshold value, the semantic matching unit 520 generates a link between corresponding categories, generating a similarity graph. At this time, as illustrated in FIG. 10, the semantic matching unit 520 sets the semantic similarity as a weight for the generated link. Here, because the weight for the link is determined by the cosine similarity between the merge centroid vectors, the weight for the link can represent a feature of a hierarchical structure of the subject classification tree.

The semantic matching unit 520 ranks semantic similarities of other categories for each category in the generated similarity graph 540 according to the wPPR algorithm proposed in the present disclosure.

For the sake of this, first, based on a link weight of the similarity graph 540, the semantic matching unit 520 determines a relevance matrix (R). In the relevance matrix (R), a (i, j) component ($r_{ij}$) means semantic similarity of an $i^{th}$ category for a $j^{th}$ category. That is, the semantic matching unit 520 determines a probability that a random surfer circulating a similarity graph makes a visit to each category, using a personalized PageRank that is one of Markov Random Walk Models widely known in the art. In a little detail, the semantic matching unit 520 can determine a probability that the random surfer makes a visit to the $i^{th}$ category from the $j^{th}$ category, determine the determined value as semantic similarity between the two categories, and rank semantic similarities of other categories for the $j^{th}$ category according to a size of the semantic similarity.

Here, a pattern in which the random surfer circulates the similarity graph can be defined as two examples. According to the first circulation pattern, the random surfer circulates the similarity graph at a probability of '(1−d)' every moment and, according to the second circulation pattern, circulates the similarity graph at a probability of 'd.' Here, the 'd' is a damping factor, and can have a real number of '0' to '1'. According to experiments, an optimal value of the 'd' can be found empirically. In an example where the random surfer follows the first circulation pattern, the random surfer makes a visit to a category reliable within the similarity graph, i.e., a $j^{th}$ category being currently in visit in the present disclosure. In an example where the random surfer follows the second circulation pattern, the random surfer makes a visit to a category linked with a category being currently in visit, at a probability proportional to a link weight. A probability that the random surfer moves to a next category when following the second circulation pattern is determined according to Equation 4 below.

Equation 4 below is a formula for determining a probability of movement of a random surfer.

$$tw_{ij} = \frac{sim(c_i, c_j)}{\sum_{c_k \in N(c_j)} sim(c_k, c_j)} \qquad (4)$$

Here, the '$tw_{ij}$' represents a probability that the random surfer moves from a $j^{th}$ category to an $i^{th}$ category, the 'sim($c_i$, $c_j$)' represents similarity between the categories, i.e., a link weight between the categories, and the 'N($c_j$)' represents the set of categories connecting with $c_j$.

Figure 11:
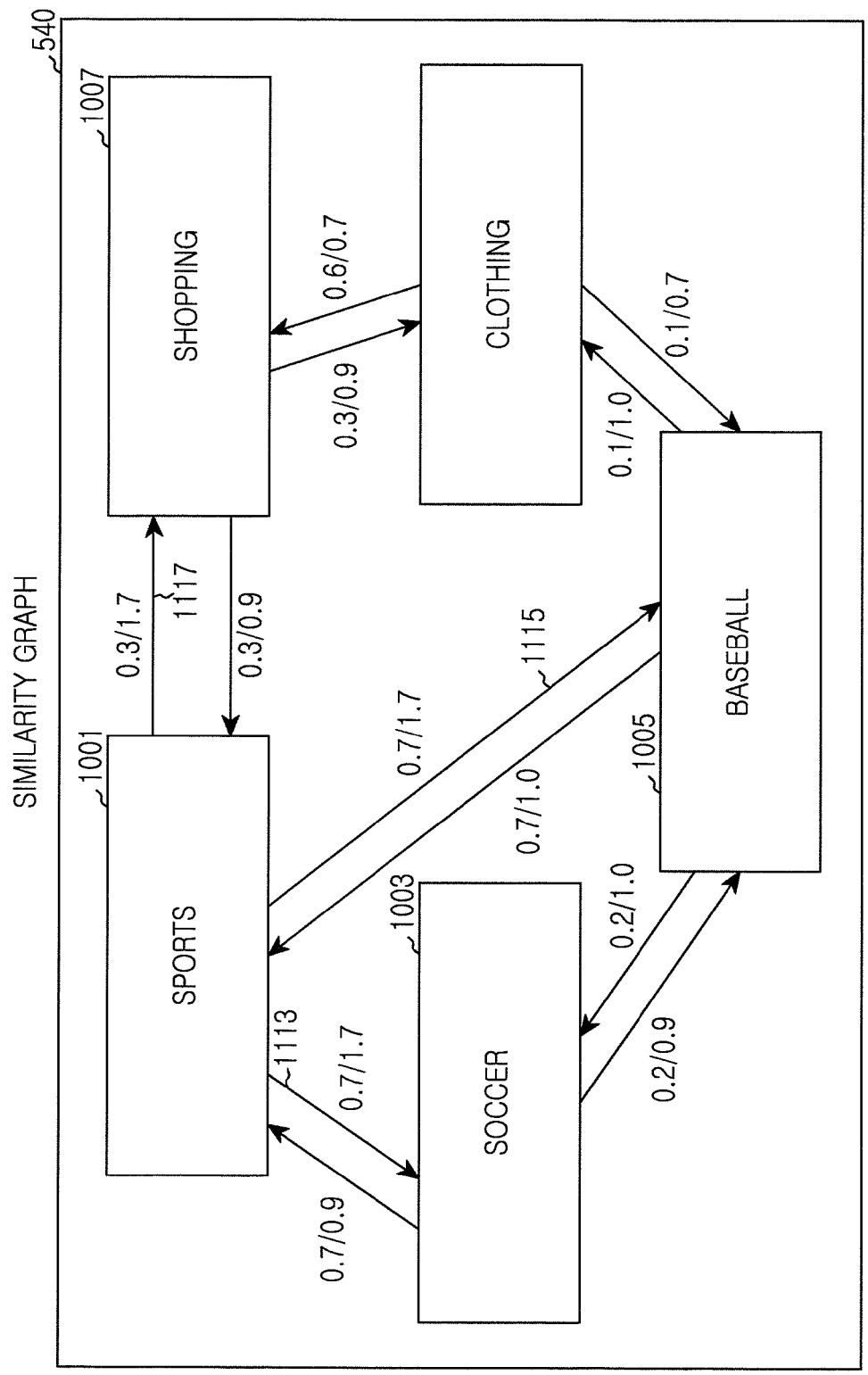
FIG. 11 is a diagram illustrating a method for obtaining a '$tw_{ij}$' value when following the second circulation pattern in an embodiment of the present disclosure.

FIG. 11 illustrates a method for obtaining a '$tw_{ij}$' value when following the second circulation pattern in an illustrative embodiment of the present disclosure.

Referring to FIG. 11, a probability (i.e., a '$tw_{ij}$' value) of movement between categories within a subject classification tree is determined based on a link weight between respective categories illustrated in FIG. 10. For instance, assuming that a random surfer currently makes a visit to a 'Sports' category 1001 and circulates a similarity graph according to the second circulation pattern at a probability of 'd', a probability of movement to each of 'Soccer', 'Baseball', and 'Shopping' categories 1003, 1005, and 1007 linked to the 'Sports' category 1001 is determined according to a ratio of sum (1.7=0.7 (1013)+0.7 (1015)+0.3 (1017)) of weights of the total links connected with the 'Sports' category 1001 to weight of a corresponding link. That is, as illustrated in FIG. 11, a probability that the random surfer moves from the 'Sports' category 1001 to the 'Soccer' category 1003 is equal to '0.7/1.7' (1113), and a probability that the random surfer moves from the 'Sports' category 1001 to the 'Baseball' category 1005 is equal to '0.7/1.7' (1115), and a probability that the random surfer moves from the 'Sports' category 1001 to the 'Shopping' category 1007 is equal to '0.3/1.7' (1117).

Based on the definition of the two circulation patterns of the random surfer, the '$r_{ij}$' can be determined according to Equation 5 below.

$$r_{ij} = d\left[\sum_{c_k \in I(c_i)} tw_{ik} \cdot r_{kj}\right] + (1-d)t_{ij} \qquad (5)$$

Here, the '$I(c_i)$' represents the set of categories having a link to '$c_i$', and the '$t_{ij}$' is for determining the first circulation pattern. In an example where a current category is set to '$c_j$', the '$t_{ij}$' represents a trusted weight of the '$c_i$'. So, in an example where 'i' is equal to 'j', the '$t_{ij}$' is set to '1' and, in remnant examples, the '$t_{ij}$' is set to '0'.

The definition of Equation 5 above using a matrix notation method can be expressed according to Equation 6 below.

$$R_t = d[W \cdot R_{t-1}] + (1-d)T \qquad (6)$$

Here, the 'R' represents a relevance matrix determined according to a wPPR algorithm, and the 'W' represents a transition matrix and has the same (i, j$^{th}$ component as the '$tw_{ij}$' of Equation 4 above. The 'T', a trusted matrix, has the same (i, j)$^{th}$ component as the '$t_{ij}$' of Equation 5 above, so the 'T' becomes a unit matrix.

That is, the semantic matching unit 520 can digitize semantic similarity between arbitrary categories on the basis of the relevance matrix of Equation 6 above. At this time, the category can be a category corresponding to a user interest subject or service item subject. Accordingly, in a example where the user interest subject is determined as a category ($c_j$), the semantic matching unit 520 can determine, as a (i, j) component value of the relevance matrix, semantic similarity between the category ($c_i$) corresponding to the service item subject and the category ($c_j$).

By linearly combining syntactic similarity and semantic similarity determined in the syntactic matching unit 510 and the semantic matching unit 520 respectively, the integration ranking unit 530 determines the total similarity according to Equation 7 below.

Equation 7 below represents a formula of determining the total similarity.

$$\text{TotalScore}(u, s_i) = (1-\lambda) \times \text{SyntacticScore}(\vec{u}, \vec{s_i}) + \lambda \times \text{SemanticScore}(uc, sc_i) \qquad (7)$$

Here, the 'uc' is a category corresponding to a user interest subject extracted from user data, and the '$sc_i$' represents a category corresponding to a service item subject. The '$\lambda$', a weight for semantic similarity in a linear combination, has a value of '0' to '1.0', and can be determined through experiment.

The integration ranking unit 530 determines relevance ranks of service items to be recommended to a user based on the total similarity determined through Equation 7 above.

Figure 13A:
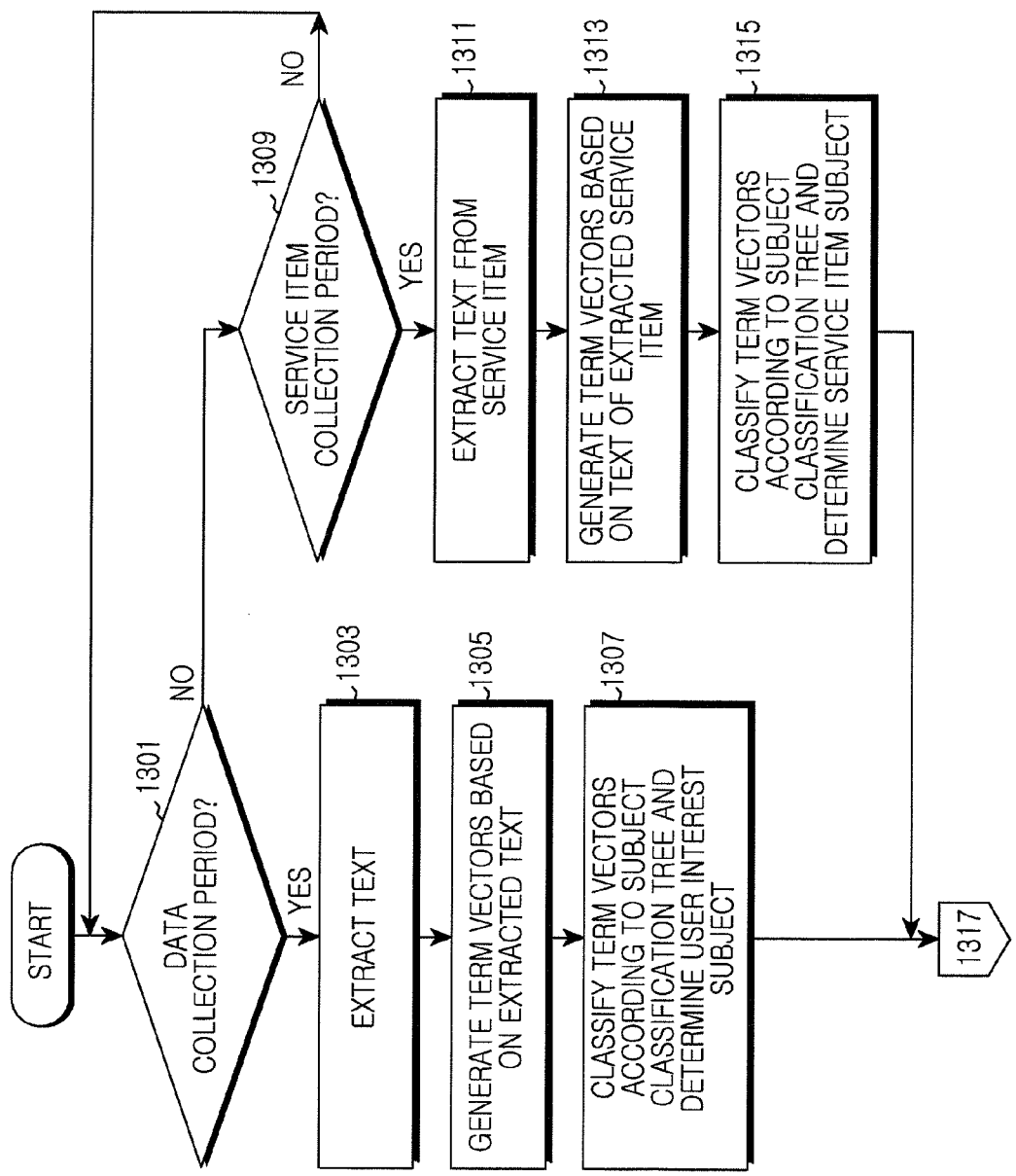
FIGS. 13A and 13B illustrate a procedure of recommending a service item according to a user interest subject in a mobile communication terminal according to an embodiment of the present disclosure.
Figure 13B:
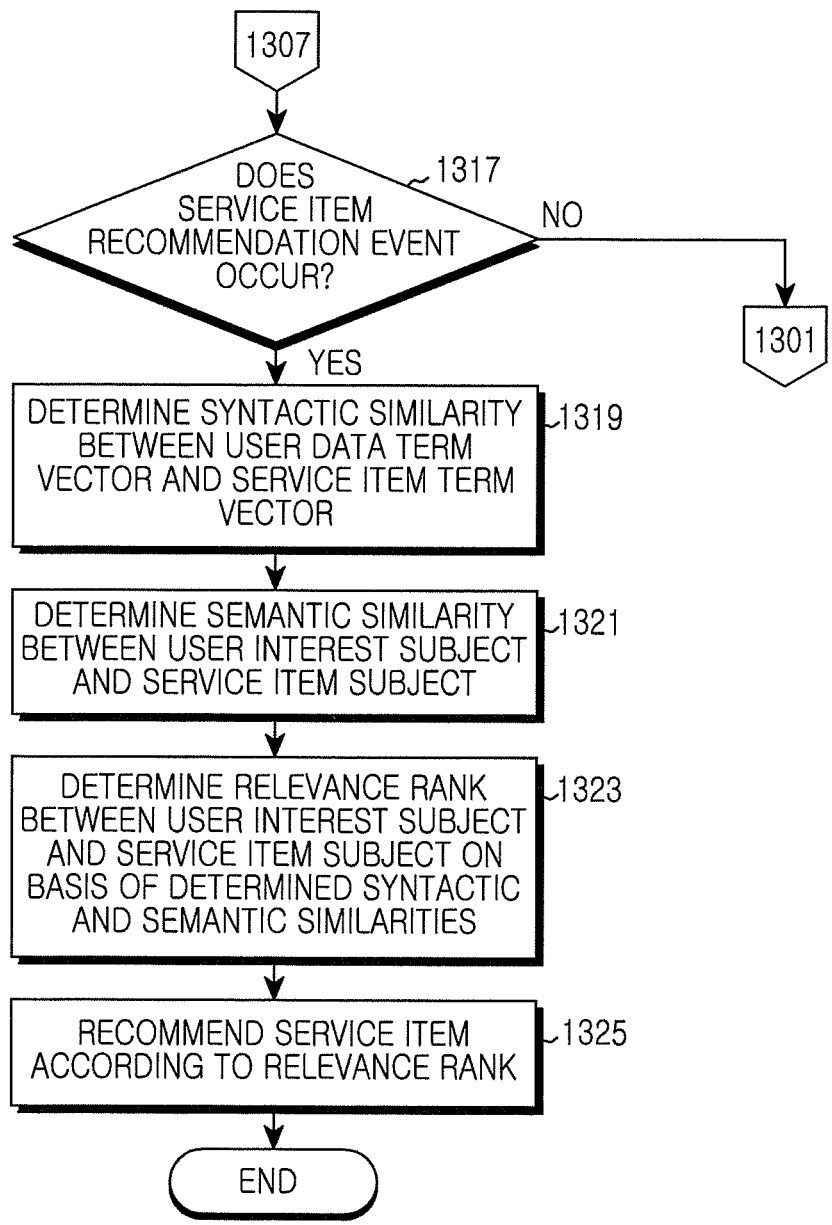

FIGS. 13A and 13B illustrate a procedure of recommending a service item according to a user interest subject in a mobile communication terminal according to an illustrative embodiment of the present disclosure.

Referring to FIGS. 13A and 13B, in operation 1301, the mobile communication terminal determines whether a preset user data collection period is present. In an example where the user data collection period is present, the mobile communication terminal proceeds to operation 1303 and extracts a text from user data existing within the mobile communication terminal. Here, the mobile communication terminal can extract the text from the user data such as a short message, a multimedia message, an e-mail, a file, a schedule, a memo, Web-usage information and the like. After that, in operation 1305, the mobile communication terminal generates term vectors based on the extracted text of the user data. And then, in operation 1307, the mobile communication terminal classifies the term vectors according to a subject classification tree embedded in the mobile communication terminal and determines a user interest subject and then, proceeds to operation 1317 below.

In contrast, in an example where the user data collection period is not present, the mobile communication terminal proceeds to operation 1309 and determines whether a preset service item collection period is present. In an example where the service item collection period is not present, the mobile communication terminal returns to operation 1301 and again performs the subsequent operations. In contrast, in an example where the service item collection period is present, the mobile communication terminal proceeds to operation 1311 and accesses the mobile Internet, collects Internet service items, and extracts a text from the collected service items. After that, the mobile communication terminal proceeds to operation 1313 and generates term vectors based on the extracted text of the service items and, in operation 1315, classifies the term vectors according to the subject classification tree and determines a service item subject and then, proceeds to operation 1317 below.

In operation 1317, the mobile communication terminal determines if a service item recommendation event takes place by a user. When the service item recommendation event does not occur, the mobile communication terminal returns to operation 1301 and again performs the subsequent operations. In contrast, when the service item recommendation event occurs, the mobile communication terminal proceeds to operation 1319 and determines syntactic similarity between a term vector for user data and a term vector for service items. At this time, the mobile communication terminal can determine the syntactic similarity between the user data term vector and the service item term vector, using Equation 1 above.

After that, in operation 1321, the mobile communication terminal determines semantic similarity between the user interest subject and the service item subject. Here, the mobile communication terminal connects respective categories in a subject classification tree according to the semantic similarity, determines a weight for a link between the respective categories, determines a probability of movement of a random surfer on the basis of a general PageRank algorithm widely known in the art, and determines semantic similarity between the respective categories, thereby being capable of determining the semantic similarity between the user interest subject and the service item subject. That is, the mobile communication terminal can determine the semantic similarity between the user interest subject and the service item subject using Equation 5 above.

Next, in operation 1323, the mobile communication terminal determines a relevance rank representing the total similarity between the user interest subject and the service item subject, based on the determined syntactic similarity and semantic similarity. After that, in operation 1325, the mobile communication terminal recommends a service item according to the determined relevance rank. Here, the mobile communication terminal can determine the total similarity between the user interest subject and the service item subject using Equation 7 above, and can determine to have a higher relevance rank as higher is the total similarity value of the service item subject for the user interest subject.

After that, the mobile communication terminal terminates the algorithm according to the present disclosure.

Here, a description is made for collecting user data and service items every constant period but, only in an example where a service item recommendation event takes place by a user, the mobile communication terminal may collect the user data and the service items.

As described above, illustrative embodiments of the present disclosure have an effect of, by determining a user interest subject from user data, collecting Internet service items, determining a subject of the service items, determining similarity between the user interest subject and the service item subject, and recommending a service according to the similarity, being capable of, even without separate input of the user interest subject, analyzing the user interest subject based on data within a mobile communication terminal and recommending a related Internet service item in the mobile communication terminal. Further, the illustrative embodiments of the present disclosure have an effect of, because analyzing the user interest subject based on the data within the mobile communication terminal, being capable of recommending a suitable Internet service item properly corresponding to the user interest subject changing every hour. Further, the illustrative embodiments of the present disclosure have an effect of, instead of transmitting user person's information to the external through a network or storing the user person's information in a server, analyzing the user interest subject based on the data within the mobile communication terminal and recommending a suitable Internet service item, thereby being capable of protecting user person's data in the mobile communication terminal.

While the invention has been shown and described with reference to certain preferred embodiments thereof, it will be understood by those skilled in the art that various changes in faint and details may be made therein without departing from the spirit and scope of the invention as defined by the appended claims.

What is claimed is:

1. A method for providing an Internet service in a mobile communication terminal, the method comprising:
   detecting a user interest subject from text of user data stored within the mobile communication terminal;
   collecting service items through an access to a network;
   detecting service item subjects for the service items;
   determining similarities between the user interest subject and the service item subjects;
   determining ranks of the service item subjects as a function of the similarities;

displaying the service items according to the ranks of the service item subjects; and responsive to one of the service items being selected, displaying detailed information related to the selected service item.

2. The method of claim 1, wherein the user data comprises at least one of a short message, a multimedia message, an electronic mail (e-mail), a file, a schedule, a memo, and Web-usage information.

3. The method of claim 1, wherein detecting the user interest subject from the user data comprises:
extracting the text from the user data;
analyzing the text and generating term vectors according to a vector space model;
classifying the term vectors according to a subject classification tree; and
detecting the user interest subject according to a classified result.

4. The method of claim 3, further comprising:
storing information on the text, wherein the information stored on the text comprises at least one of a generation time and generation position of the text, a kind of an application, a feature of the application, a revision time of the application, a generation time of the application, and context information of the application.

5. The method of claim 3, wherein the term vector reflects a weight dependent on an importance of a corresponding term within the text corresponding to the term vector.

6. The method of claim 1, wherein detecting the service item subject for the service items comprises:
extracting a text from the service items;
analyzing the text and generating term vectors according to a vector space model; and
classifying the term vectors according to a subject classification tree and detecting a subject for each of the collected service items.

7. The method of claim 6, further comprising:
storing information on the text, wherein the information stored on the text comprises at least one of a generation time and generation position of the text, a kind of an application, a feature of the application, a revision time of the application, a generation time of the application, and context information of the application.

8. The method of claim 6, wherein the term vector reflects a weight dependent on an importance of a corresponding term within a text corresponding to the term vector.

9. The method of claim 1, wherein determining the similarities between the user interest subject and the service item subjects comprises:
detecting syntactic similarity between a term vector generated from the user data and a term vector generated from the service item;
detecting semantic similarity between the user interest subject and the service item subject; and
detecting a total similarity based on the syntactic similarity and the semantic similarity, and
wherein the syntactic similarity is cosine similarity between the term vector generated from the user data and the term vector generated from the service item.

10. The method of claim 9, wherein determining the semantic similarity comprises:
detecting an average term vector of learning data on respective categories in a subject classification tree;
detecting merge vectors reflecting hierarchical relationships between the respective categories using the average term vector;
detecting a link weight between the respective categories using cosine similarity between the merge vectors of the respective categories;
detecting a probability of movement between the respective categories based on the link weight; and
detecting semantic similarity using the probability of movement between the respective categories.

11. An apparatus for providing an Internet service in a mobile communication terminal, the apparatus comprising:
a controller configured to:
detect a user interest subject from text of user data stored within the mobile communication terminal;
collect service items through an access to a network;
detect service item subjects for the service items;
determine similarities between the user interest subject and the service item subjects;
determine ranks of the service item subjects based on the similarities;
display the service items according to the ranks of the service item subjects; and
responsive to one of the service items being selected, display detailed information related to the selected service item.

12. The apparatus of claim 11, wherein the user data comprises at least one of a short message, a multimedia message, an electronic mail (e-mail), a file, a schedule, a memo, and Web-usage information.

13. The apparatus of claim 11, wherein the controller is configured to extract the text from the user data, analyze the text and generates term vectors according to a vector space model, and then classify the generated term vectors according to a subject classification tree and detect the user interest subject.

14. The apparatus of claim 13, wherein the controller is configured to store information on the text, and wherein the information stored on the text comprises at least one of a generation time and generation position of the text, a kind of an application, a feature of the application, a revision time of the application, a generation time of the application, and context information of the application.

15. The apparatus of claim 13, wherein controller is configured to reflect a weight dependent on an importance of a corresponding term within the text corresponding to the term vector.

16. The apparatus of claim 11, wherein the controller is configured to extract a text from the service items, analyze the text and generates term vectors according to a vector space model, and then classify the generated term vectors according to a subject classification tree and detect a subject for each of the service items.

17. The apparatus of claim 16, wherein the controller is configured to store information on the text, and wherein the information stored on the text comprises at least one of a generation time and generation position of the text, a kind of an application, a feature of the application, a revision time of the application, a generation time of the application, and context information of the application.

18. The apparatus of claim 16, wherein the controller is configured to reflect a weight dependent on an importance of a corresponding term within a text corresponding to the term vector.

19. The apparatus of claim 12, wherein the controller is configured to detect syntactic similarity between a term vector generated from the user data and a term vector generated from the service item, detect semantic similarity between the user interest subject and the service item subject, and detect a total similarity based on the syntactic similarity and the semantic similarity, and wherein the syntactic similarity is a cosine similarity between the term vector generated from the user data and the term vector generated from the service item.

20. The apparatus of claim 19, wherein the semantic similarity is determined by detecting an average term vector of learning data on respective categories in a subject classification tree, detecting merge vectors reflecting hierarchical relationships between the respective categories using the average term vector, detecting a link weight between the respective categories using cosine similarity between the merge vectors of the respective categories, detecting a probability of movement between the respective categories based on link weight, and detecting a semantic similarity using the probability of movement between the respective categories.

* * * * *